Dec. 18, 1923.

R. L. HIBBARD ET AL 1,477,562

GEAR CUTTING

Filed Jan. 24, 1922

INVENTORS,
R. L. Hibbard
and
F. W. Wappat
by
James C. Bradley
atty

Dec. 18, 1923.　　　　1,477,562
R. L. HIBBARD ET AL
GEAR CUTTING
Filed Jan. 24, 1922　　6 Sheets-Sheet 5

INVENTORS
R. L. Hibbard
and
F. W. Trappet
by
James C. Bradley
atty.

Patented Dec. 18, 1923.

1,477,562

UNITED STATES PATENT OFFICE.

ROBERT L. HIBBARD AND FRED W. WAPPAT, OF PITTSBURGH, PENNSYLVANIA.

GEAR CUTTING.

Application filed January 24, 1922. Serial No. 531,359.

*To all whom it may concern:*

Be it known that we, ROBERT L. HIBBARD and FRED W. WAPPAT, both citizens of the United States, residing at Pittsburgh, in the county of Allegheny and State of Pennsylvania, have invented certain new and useful Improvements in Gear Cutting, of which the following is a specification.

The invention relates to gear cutting and particularly to those operations in which the teeth are cut by a planing action. The invention is designed particularly for use in cutting bevel gears and is so illustrated and described, but the invention is not limited to use in such connection, being capable of broad application. The purpose of the invention is to cheapen the planing of gears by reducing the time required for the machining and also to give a smoother and more uniform product.

Heretofore it has been the practice to machine the teeth of bevel and other gears by means of a reciprocating cutter movable longitudinally of the teeth to be planed toward the cone center of the gear being cut, the cutter starting at the outer edge of the tooth and being fed in step by step after each cut until the base of the tooth was reached, when the tool was withdrawn and the gear rotated one circular pitch space. This operation was continued until all the teeth were machined. The number of strokes required for machining one tooth surface of course varied depending upon the hardness of the metal of the gear, the size of the teeth, and other considerations, but in any case upward of twenty reciprocations of the cutter were required to plane one side face of a gear tooth.

The present machine and operation are designed to reduce the number of cuts by the provision of a means and mode of procedure whereby only one stroke of the cutting tool is required to completely plane or machine one of the gear teeth faces. Briefly stated, this is accomplished by using a long cutter tool which reciprocates longitudinally of the gear teeth toward the cone center of the gear and which is provided with a large number of cutting teeth or elements. During the inward movement of this cutter the arbor or axis on which the gear is mounted is swung about the cone center of the gear so that the tool, which at the time it starts its cut engages the gear tooth at its outer edge, is caused to pass over the entire tooth face and plane it. This swinging of the gear which carries the tool over the face of the tooth is the equivalent of actually feeding the cutter toward the base of the tooth with the gear held still, the requirement being merely the relative movement necessary to secure the feed. This compound relative movement which results in planing the entire tooth surface requires that the various cutter teeth of the tool each move inward slightly toward the base of the gear tooth as they move longitudinally thereof, so that each tooth of the cutter moves and cuts on a slight curve.

During the compound movement as just described, the cutter must also have a third relative movement with respect to the work. That is, the movement described would produce a flat or plane gear face surface, and the requirement is for a surface which is involute or of some other curve suitable for spur or bevel tooth contact. To secure this third relative movement, the carriage upon which the cutter tool is mounted is swung laterally during the relative longitudinal and inward feed of the cutter so that the desired curvature in the gear tooth face is secured. This third relative movement may also either be secured by giving the tool the necessary movement or by giving the gear tooth such movement. Both arrangements are illustrated and described and it will be understood that in defining the scope of the invention, where a definition of feed is involved, it refers to a relative movement of the work and cutter.

The preferred machine and procedure also involve the use of duplicate cutters working alternately on gear teeth at opposite sides of the gear being planed, which arrangement still further speeds up the operation, one cutter serving to cut one face of each of the gear teeth and the other cutter serving to cut the other face of each tooth. This feature is of value whether a cutter is employed having a plurality of cutter teeth or a single cutter tooth. Between the successive planing of the teeth the gear being cut is rotated by suitable indexing mechanism to bring the next teeth to proper position. It is of advantage to operate the cutters alternately, rather than at the same time, as this gives a better distribution of the load upon the machine, making it operate more smoothly and with less wear and strain upon the driving mechanism, and the alternate cutting further provides for proper clearance of the cutters opposite the end of the gear arbor (Fig. 1), such as would not be the case, if the cutters operated to cut simultaneously, particularly in the case in the cutting of the smaller sizes of bevel gears. In fact this arrangement makes possible the use of the long cutters with the multiple teeth.

The procedure and machine as above described not only plane the contact surfaces of the teeth of a gear in a small fraction of the time hitherto required, which is the most important phase of the improvement, but give a smoother, better product, as the single stroke of the multiple tool gives a better result, as far as accuracy and smoothness of surface is concerned, than the twenty to forty independent cuts of the machines heretofore commonly employed. This is due perhaps to the more definite and fixed relation of the cutters on the multiple cutter which affords less variation in the position and character of the various cuts than is the case with the cuts made during different strokes by the old type of machine.

Certain embodiments of the invention are illustrated in the accompanying drawings wherein.

Figure 3:
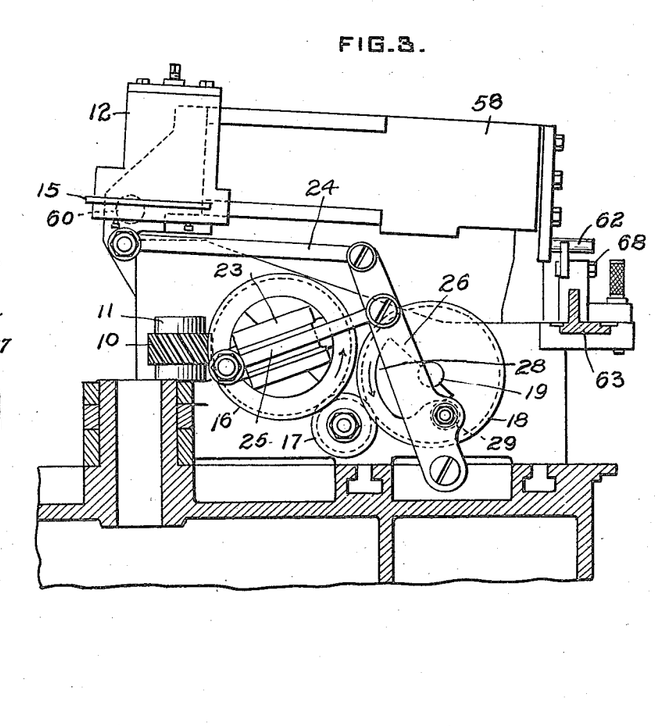
Fig. 3 is a section through a part of the machine on the line III—III of Fig. 1, showing the tool carriage and operating means therefor in side elevation.

Referring to the drawings, 1 is the base of the machine carrying the vertical center shaft 2, (Fig. 4) whose axis of rotation 3 cuts through the cone center of the bevel gear 4, which is shown as being machined. The shaft 2 is driven from the cone pulley 5 through the shaft 6 and gears 7 and 8. The shaft carries at its upper end a pinion 9 which meshes with a pair of spiral idler gears 10, 10 (Figs. 1 and 4) on the shafts 11 and 11. From these shafts the reciprocating tool or cutter carriages 12 and 13 carrying the tools 14 and 15 are operated by means of two trains of gearing and other devices which are duplicates so that the following description of the means for reciprocating the carriage 12 will be sufficient for both. The spiral gear 10 meshes with the spiral gear 16 (Fig. 3) carried by a stub shaft, not shown, and this gear drives a spiral idler 17, which in turn drives the spiral gear 18 carried by the stub shaft 19. The gear 16 has on its front side the block 23 which has a pawl or dog connection, so that the block is driven in a counter clockwise direction. This block is connected with the carriage 12 by means of the rods 24 and 25 and lever 26 to give the tool 15 its cutting movement to the left (Fig. 3). A quick return of the carriage and tool to the right is secured by the gear 18, which gear is provided with a cam 28 adapted to engage a roller 29 on the rear side of the lever 26. The cam is timed to engage the roller on the lever when the cam is at about the position shown, so that the lever and carriage are moved quickly to the right, the pawl or dog connection between the disc 22 and block 23 permitting this, so that a quick return of the carriage is secured. This construction for a quick return, being well known in the art needs no detail description or illustration of parts and it will be understood that any other of the common movements for securing this quick return action of a reciprocating tool carriage may be employed.

Figure 1:
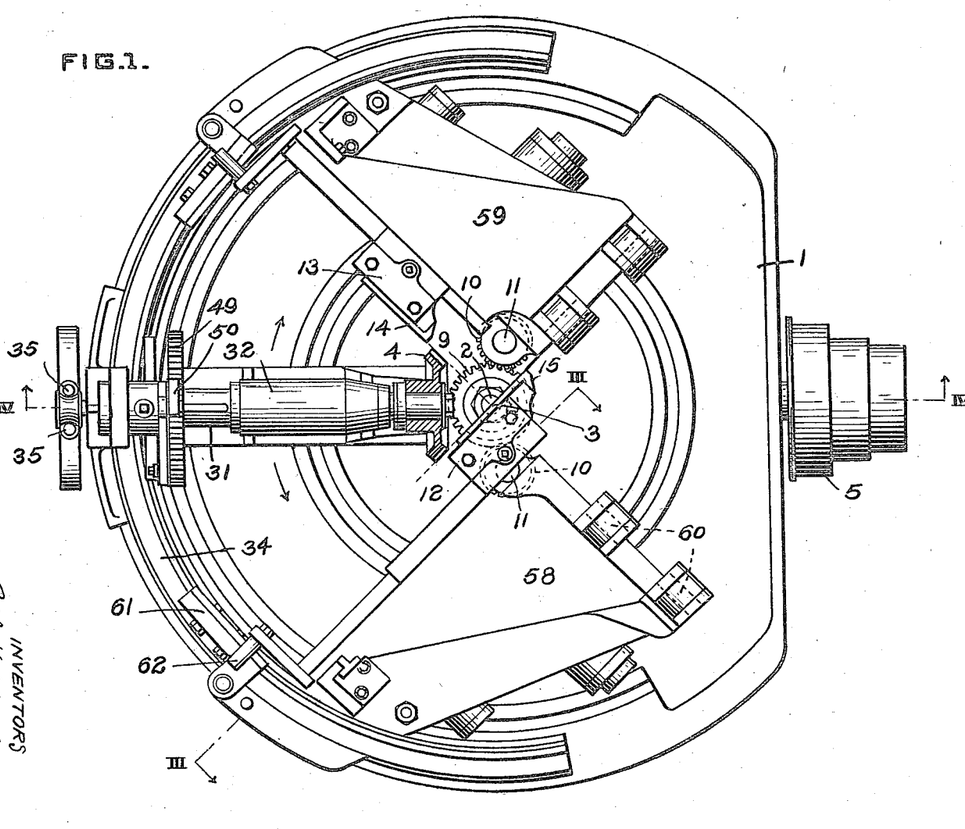
Figure 1 is a plan view of the machine.
Figure 5:
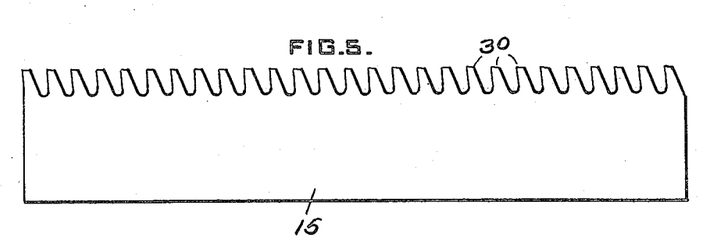
Figs. 5 and 6 respectively are a side elevation and section through the multiple cutter on an enlarged scale.
Figure 6:
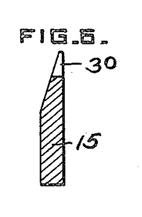

The two tools or cutters 14 and 15 which are employed are similar in character, one of such tools 15, being shown in detail in Figs. 5 and 6, and their position in use being shown in Fig. 1. They are clamped in the tool carriages in any approved way with their cutting edges positioned, so that the line of such edges extended passes through the axis 3 of the center shaft 2 and through the cone center of the gear 4 which is being cut. The tool is provided with a plurality of cutting teeth 30 arranged in line and varying in number depending on conditions. Twenty-five teeth have been used, spaced apart about one fourth of an inch.

Figure 8:
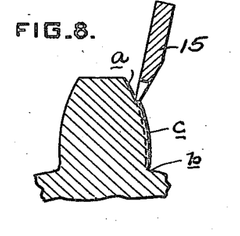
Fig. 8 is a detail view showing the relation of the cutter to the gear tooth being planed.

In order that the cutter may pass over the entire face, $c$, of a gear tooth (Fig. 8) in making its forward stroke longitudinally of the gear tooth, there must be what amounts to a feed of the tool inwardly from the outer edge, $a$, of the tooth to the base, $b$, and this is preferably (though not necessarily) accomplished by moving the gear. This is done in the machine illustrated by mounting the arbor 31 upon a carriage 32 so that it can be oscillated back and forth in a horizontal plane about the cone center 3 as indicated by the arrows in Fig. 1. When the arbor is in the position shown in Fig. 1, the tool 15 will cut at the outer edge of the tooth face along the line $a$ (Fig. 8), but as the outer end of the arbor swings in a counter clock-wise direction around the axis 3, the tooth face will move to the right (Fig. 1) causing the cutting face of the tool to approach the base $b$ of the tooth and in such movement to sweep over and plane the entire face, $c$. On the movement of the arbor in the reverse direction the tool 14 similarly passes over the face of a tooth on the opposite side of the gear.

Figure 2:
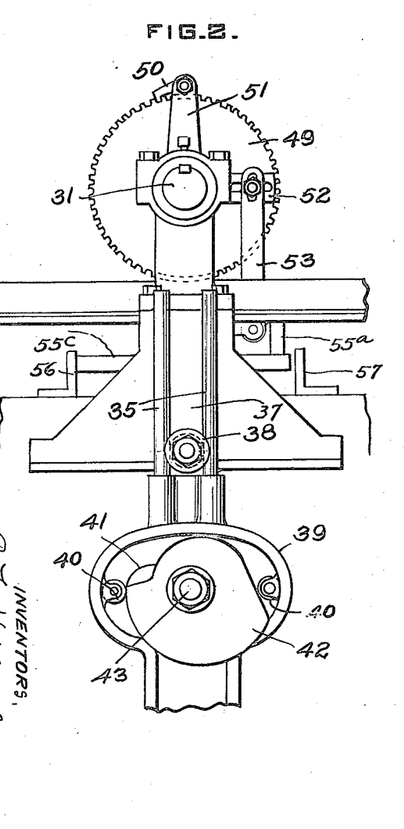
Fig. 2 is a partial side elevation.
Figure 4:
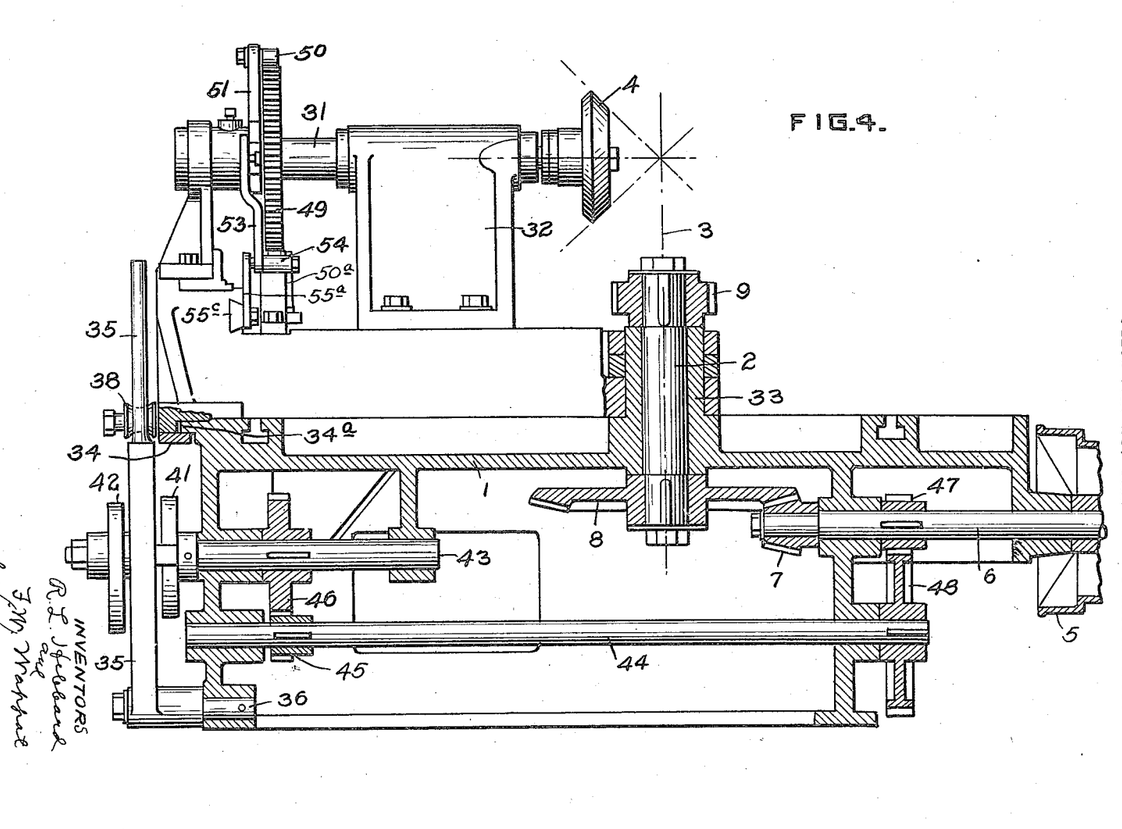
Fig. 4 is a section on the line IV—IV of Fig. 1.

The arbor carriage 32 is swivelled around a boss 33 on the machine base as indicated in Fig. 4, the outer portion of such carriage being held and guided during its swinging movement by the gib 34 which engages the flange 34ª on the base 1 (Fig. 4). The oscillation is accomplished by means of the arm 35, which is fulcrumed on the pin 36 (Fig. 4) secured to the base casting and which is provided with a slot 37 (Fig. 2) engaging a roller 38 projecting from the arbor carriage 32, (Fig. 4). Intermediate the fulcrum pin 36 and roller 38 the arm has a cam loop 39 provided with a pair of rollers 40, 40 engaging the operating cams 41 and 42 for swinging the arm in both directions. These cams are keyed to the shaft 43 in the base casting (Fig. 4) driven from the counter shaft 44. The counter shaft is provided with the pinion 45 engaging the spur gear 46 on the shaft 43, while the counter shaft 44 is driven by the pinion 47 on the shaft 6 which engages the gear 48 on the shaft 44. The parts for oscillating the arm are so timed that as the cutters 14 and 15 move in alternately to carry them longitudinally of the teeth being cut, the arbor carriage and gear are swung toward the cutters, so as to carry the cutters over the tooth surfaces to the bases thereof, thus planing each tooth surface at one stroke. After a tooth is planed the gear is swung in the reverse direction and during this reverse movement the cutter which has finished its cut is retracted to the starting position. This retraction occurs only after the carriage has swung far enough to clear the cutter from the gear.

Figures 9, 10:
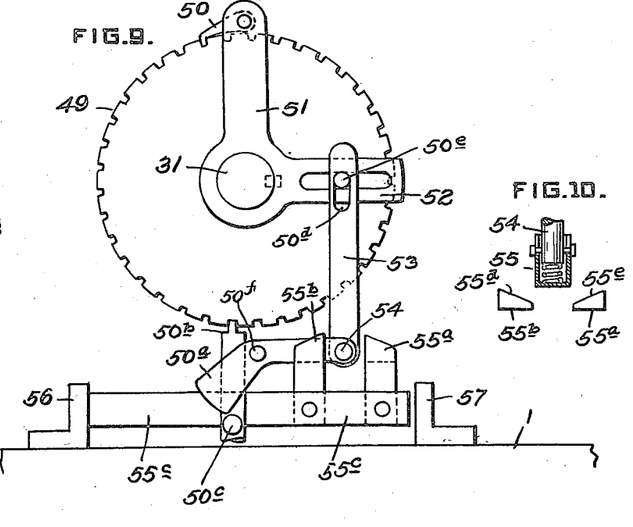
Figs. 9 and 10 are detail views showing the means for rotating the gear arbor step by step.

The oscillation of the arms 35 is also preferably utilized to give the gear being cut a step by step rotation after each cutting operation, although any other suitable means may be used for this function. The means employed comprises the toothed wheel 49 keyed to the gear arbor 31 and actuated by the pawl 50 carried by the arm 51 of a bell crank lever swivelled on the arbor and provided with a lateral arm 52, having an adjustable lost motion connection with the arm 53. The arm 53 is guided for vertical movement and connected at its lower end to the cam member 50ª by a pin 54 having a spring pressed socket end 55 as indicated in Figs. 9 and 10, Fig. 10 being a diagrammatic plan view looking down on the cams 55ª and 55ᵇ carried by the slide plate 55ᶜ. The cam member 50ª, pivoted at 50ᶠ, is designed to release the spring pressed detent 50ᵇ when the arm 53 is moved upwardly, the end of the cam member at such time engaging and moving downwardly the pin 50ᵉ carried by the detent 50ᵇ. This occurs while the arm 53 is moving up and before the end of the slot 50ᵈ engages the pin 50ᵉ. The inner faces of the cam members 55ª and 55ᵇ are inclined as indicated in Fig. 10 so that the spring pressed end of the pin 54 can be moved from the position shown to the right past the cam member 55ª without lifting the arm 53 or to the left of the member 55ᵇ without lifting such arm. On the other hand when the pin 54 is moved from a position to the right of the member 55ª to the position shown or from a position from the left of the member 55ᵇ to the position shown the arm 53 will be raised rocking the arm 51 and turning the wheel 49 by means of the pawl 50, the detent 50ᵇ intermediate such movements acting as a locking device for the wheel 49. The movement of the slide 55ᶜ is accomplished by the stops 56 and 57 carried by the base casting 1 which engage the ends of the slide and cause the rotation of the gear arbor as the arbor carriage reaches the end of its lateral swing. If the number of teeth on the gear 5 being cut is odd, the gear must be rotated the full circular pitch (space between teeth plus thickness of tooth on pitch line) after the cutting movement of one cutter, such as the cutter 15, preliminary to its next cut and before the cutting action of the other cutter 14 and in that case only the one cam member 55ᵇ is used, the pin 54 riding up over the top cam surface of such member as the arbor carriage moves to the right (Fig. 9) and turning the wheel 49 and riding past such member without riding up on the reverse movement by virtue of the cam surface 55ᵈ. On the other hand, if the number of gear teeth is even, the cam wheel must be rotated ahead one half of the circular pitch twice during the oscillation of the arbor carriage and in that case both cam members are used and the adjustment of the upper end of the arm 53 on the arm 52 or the height of the cam members used is such as to give only half the lift of the arm 53 employed in the case of the odd number of teeth above described. Under this adjustment the movement of the carriage to the left after the cutter 15 completes its cut causes the pin 54 to ride up over the cam 55ª moving the wheel ahead one notch after which the pin moves to the left of the cam 55ᵇ without being lifted by reason of the cam surface 55ᵈ. On the movement of the carriage to the right after the cutter 15 finishes its cut, the pin is lifted by the member 55ᵇ, feeding the wheel ahead another notch, passes the member 55ª without being lifted by reason of the surface 55ᵉ and arrives at its original position. The requirement that the feed of the gear should be the full circular pitch, when the teeth are odd in number and one half such pitch when the teeth are even in number, is due to the fact that the cutters 14 and 15 are at 180° from each other. With a gear having an odd number of teeth, the surfaces of the two teeth to be cut by the two cutters are at 180° from each other, so that after the two cuts are made, a further feed of the full circular pitch will bring the next two surfaces to be cut into position to be engaged by the tools. On the other hand, when the teeth are even in number, the two surfaces to be cut are not at 180° from each other, but are at 180° plus half the circular pitch. Therefore, after one tool has cut its tooth surface, the gear must be rotated one half the circular pitch in order to bring the tooth on the opposite side of the gear to proper position to receive the cut by the other tool.

The two relative feed movements of the cutters and work as described thus far would secure the planing of a flat tooth surface only. To secure the desired curvature of the tooth surface, as for instance the involute curve, another motion must be imparted either to the gear or to the cutter. In the present instance this is secured by giving the tool carriages the desired movement. To accomplish this result the carriages 12 and 13 are mounted in the tilting guide frames 58 and 59. Confining the description to the one guide since they are duplicates, the guide frame 58 (Fig. 3) is pivoted to the base casting at 60 (Figs. 1 and 3) and has its other end free to be moved up and down. The upward movement is produced during the inward cutting movement of the tool by means of a slide cam 61 (Fig. 7) mounted on the base casting and sliding under a roller 62 carried by the free end of the guide frame. The cam is reciprocated by means of a plate connection 63 forming an extension or arm from the swinging arbor frame 32. As this frame moves to the right, and the cutter 15 moves inward toward the cone center 3 and at the same time sweeps inward on the gear tooth toward its base, the cam 61 is pushed beneath the roller 62 moving the swinging guide up and causing a lateral deflection of the cutter so that a curved tooth surface is secured instead of a flat surface, the character of the curvature being determined by the curvature of the face of the cam 61. The curvature of the cam corresponds to that produced on the tooth cut, and the deflection of the cutter, as compared with the size of the cam 61 is slight due to the reduction in movement because of the relative distance of the carriage pivot 60 (Fig. 3) from the cutter 15, as compared with that from the pivot 60 to the cam engaging the roller 62. This insures accuracy in the tooth curvature as any inaccuracy in the cam is reduced to minimum proportions in the movement of the cutter.

Briefly stated the operation is as follows: The rotation of the drive shaft rotates the center shaft 2 and shaft 43 through the intermediary of the gearing of Fig. 4. The rotation of the shaft 2 reciprocates the tool or cutter carriages 12 and 13 by means of the gearing of Fig. 3, the rotation of the gear 16 (Fig. 3) giving the slow forward stroke of the tool carriage and the gear 18 giving the quick return. The rotation of the shaft 43 (Fig. 4) operating through the cams 40 and 41 and rocker arm 35 (Fig. 2) oscillates the arbor carriage 32 back and forth around the center line 3 of the machine which also constitutes the cone center of the bevel gear 4 which is to be cut. The oscillation of the arm 35 and arbor carriage 32 rotates the gear 4 ahead step by step around its arbor by means of the toothed wheel 49 (Fig. 2), pawl 50, bell crank 51, 52, arm 53 and the parts shown in Fig. 9. This movement of the arbor carriage also pushes the cam 61 (Fig. 7) under the roller 62 to oscillate the tool guide 58 around its pivot 60 (Fig. 3) as the tool carriage 12 moves forward. As the cutter 14 moves forward, and starts its cut at the outer edge of the gear tooth, the gear arbor 31 is rocked toward the right, so that as the tool moves ahead, its successive teeth engage the tooth surface nearer and nearer the base of the gear tooth, the last tooth of the cutter planing the extreme inner portion of the gear tooth at its base. During this movement the cam 61 has been swinging the tool around the pivot 60, so that the relative movement of the cutter inward follows a curve, instead of a straight line, thus giving a curved machine surface. Also during this forward movement to the tool 15, the tool 14 is being retracted in preparation for a cut. As the tool 15 approaches the point shown in Fig. 1, the stop 57, (Fig. 9) engages the bar 55ᶜ stopping its movement and causing the pin 54 to ride up on the cam 55ᵇ and operate the gear rotating device 50, 51 to rotate the gear to bring a new tooth into position. As the tool 15 is now moved back, the carriage of the cutter 14 moves forward to make its cut, and the gear arbor swings to the left, the various movements as to this cutter being the duplicate of those described for the cutter 15. The gear rotating device will be set to operate according to the spacing of the gear teeth as heretofore set forth depending on whether the number of teeth are of an even or an odd number.

Figure 7:
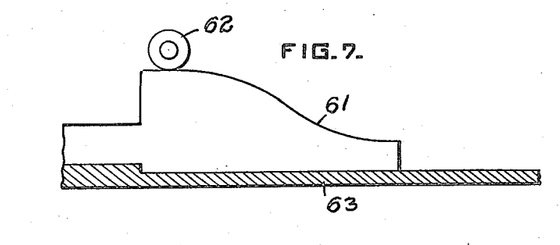
Fig. 7 is a detail side elevation showing the cam and roller for swinging the cutter carriage.
Figure 11:
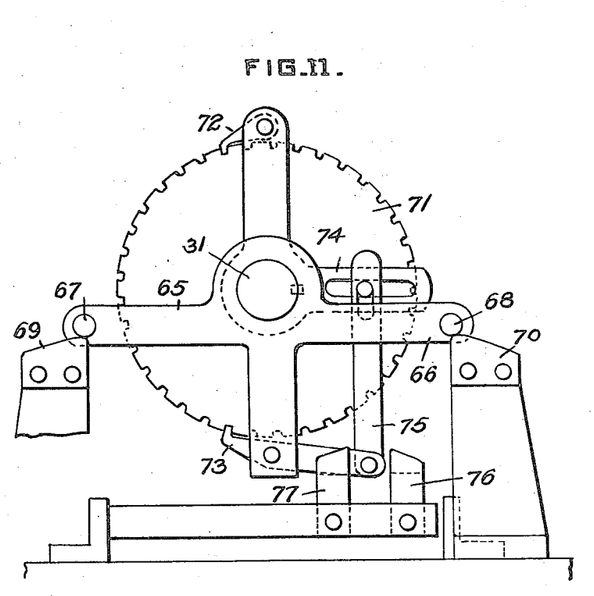
Figs. 11, 12 and 13 are side elevation and sectional views of modifications.

Fig. 11 illustrates in a diagrammatic way the modification heretofore alluded to in which the relative movement between the gear tooth and the cutter to secure the curved tooth surface is produced by a means other than the tilting of the tool carriage about its pivot 60 by the cam 61 of Fig. 7. In the present construction the gear arbor 31 is rotated slightly to secure the desired result instead of tilting the tool carriage, such tool carriage having only a reciprocatory movement in and out on a straight line. The arbor is rotated as it swings laterally by means of the arms 65 and 66 in which it is keyed, or otherwise secured so as to be turned thereby, such arms being provided with the rollers 67 and 68 engaging the cams 69 and 70 carried by the case casting. As the arbor frame swings to the right, the roller 68 follows the cam 70 tilting the gear being cut to produce the desired curvature. The reaction between the cutter and its work tends to hold the roller against the cam, but this is preferably supplemented by a spring (not shown). The action on the reverse movement between the roller 67 and cam 69 is similar. The rest of the mechanism including the toothed wheel 71, pawls 72 and 73, arms 74 and 75 and cams 76 and 77 are the same in construction and operation as the similar parts already described in connection with Figs. 9 and 10.

Figure 12:
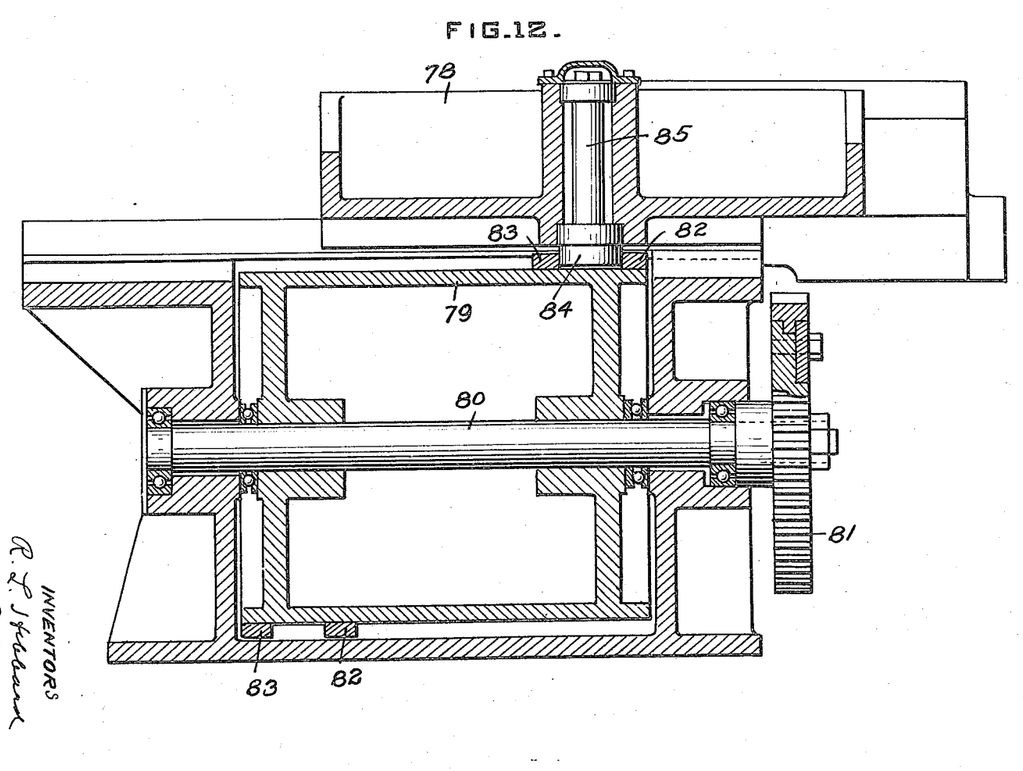
Figure 13:
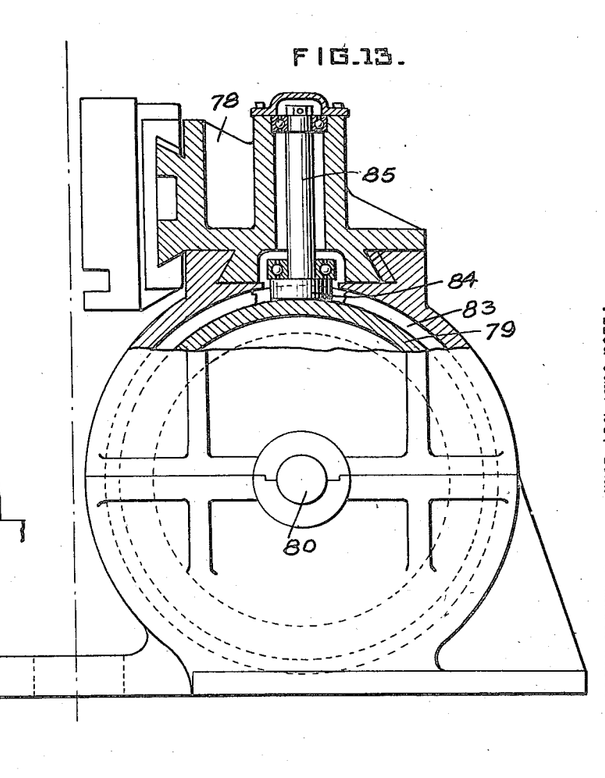

Figs. 12 and 13 are two sections at right angles to each other illustrating a modified construction for reciprocating the tool or cutter carriage in place of the construction illustrated and described in connection with Fig. 3. In this modified arrangement the cutter carriage 78 is reciprocated in the guides shown in Fig. 13 by means of a cam drum 79 mounted for rotation on the axle 80 and driven from the gear 81 connected with the driving mechanism of the machine. This drum has a cam groove around its periphery formed by the use of the strips 82 and 83 secured to the surface of the drum and engaging the roller 84 carried on the pin 85 secured in the tool carriage. The cam groove is so shaped as to give the desired rate of advance to the tool carriage and the quick return characteristic of the other type of reciprocating device heretofore described.

The two cutters 14 and 15 preferably work on the teeth of the blank at approximately 180 degrees from each other, but this is not necessarily the case, and the feature of the invention involving the use of the two cutters is not limited to the 180 degrees spacing. It will also be understood that the invention is not limited to the use of the particular cutter illustrated and described in which the teeth are shown as alined. This detail of construction is preferred and calls for the inward movement of the cutter with respect to the gear tooth as heretofore described so as to machine the entire area $c$ (Fig. 9) from the outer edge to the base of the tooth, but the machining of the entire tooth face from its outer edge to its base may be accomplished (although not to the same advantage), without this alined arrangement of teeth, and without the inward feed, the only requirement in so far as the broad invention is concerned being that the series of cutter teeth be so positioned relatively that they will successively engage the gear tooth surface and successively cut at progressively varying distances from the base of the teeth during the forward stroke of the cutter so as to machine the desired area at one stroke.

What we claim is:

1. In combination in a gear tooth planing machine, a support for a gear to be cut, a cutter having a plurality of cutting teeth arranged one behind the other in series, means for moving the cutter longitudinally of the gear tooth to be cut, means for securing a feed of the cutter toward the base of the gear tooth as the cutter moves forward, and means for securing a movement of the cutter laterally from the line of said feed to produce the desired tooth curvature, comprising a cam having a curvature corresponding to the desired tooth curvature and arranged to operate through reducing means to rock the cutter from said line of feed.

2. In combination in a gear tooth planing machine, a support for a gear to be cut, a cutter having a plurality of cutting teeth arranged one behind the other in series, means for moving the cutter longitudinally of the gear tooth to be cut, means for securing a feed of the cutter toward the base of the gear tooth as the cutter moves forward, so that the entire side face of the tooth is planed from its outer end to its base on the single forward movement of the cutter, and cam means operating through reducing means for securing a movement of the cutter laterally from the line of said feed to produce the desired tooth curvature.

3. In combination in a bevel gear tooth planing machine, a rotary arbor or support for a gear to be cut, a cutter having a plurality of cutting teeth arranged one behind the other in series, means for moving the cutter longitudinally of the tooth to be cut toward the cone center of the gear, means for securing a feed of the cutter toward the base of the gear tooth as the cutter moves forward, comprising mechanism for giving the arbor and the cutter a relative oscillating movement of approach around the cone center of the gear as an axis, and means for securing a movement of the cutter laterally from the line of said feed to produce the desired tooth curvature.

4. In combination in a bevel gear tooth planing machine, a rotary arbor or support for a gear to be cut, a cutter having a plurality of cutting teeth arranged one behind the other in series, means for moving the cutter longitudinally of the tooth to be cut toward the cone center of the gear, means for securing a feed of the cutter toward the base of the gear tooth as the cutter moves forward, comprising mechanism for oscillating said arbor about said cone center, and means for securing a movement of the cutter from the line of said feed to produce the desired tooth curvature.

5. In combination in a bevel gear tooth planing machine, a rotary arbor or support for a gear to be cut, a cutter having a plurality of cutting teeth arranged one behind the other in series, means for moving the cutter longitudinally of the tooth to be cut toward the cone center of the gear, means for securing a feed of the cutter toward the base of the gear tooth as the cutter moves forward, comprising mechanism for oscillating said arbor about said cone center, and means for securing a movement of the cutter from the line of said feed to produce the desired tooth curvature, said latter means comprising mechanism for swinging the cutter outward from said line of feed.

6. In combination in a bevel gear tooth planing machine, a rotary arbor or support for a gear to be cut, a pair of cutters on opposite sides of the gear mounted for reciprocation longitudinally of opposing teeth on said gear toward the cone center of the gear, and means for alternately giving the cutters an inward cutting movement so that during the cutting movement of one cutter the other is moving backward.

7. In combination in a bevel gear tooth planing machine, a rotary arbor or support for a gear to be cut, a pair of cutters on opposite sides of the gear mounted for reciprocation longitudinally of opposing teeth on said gear toward the cone center of the gear, means for alternately giving the cutters an inward cutting movement, and means for rotating the gear ahead one half of the circular pitch of the gear after one cutter has finished its cut and before the other cutter has started its cut.

8. In combination in a bevel gear tooth planing machine, a rotary arbor or support for a gear to be cut, a pair of cutters on opposite sides of the gear mounted for reciprocation longitudinally of opposing teeth on said gear toward the cone center of the gear, and each provided with cutting teeth arranged in series one behind the other, means for alternately giving the cutters an inward cutting movement, so that during the inward cutting movement of one cutter the other is moving out, and means for giving the gear arbor and cutters a relative oscillatory movement of approach about said cone center so that the cutter teeth of each cutter are, during their inward movement, fed over the faces of the gear teeth from their outer edges to their bases thus planing such faces at one stroke.

9. In combination in a bevel gear tooth planing machine, a rotary arbor or support for a gear to be cut, a pair of cutters on opposite sides of the gear mounted for reciprocation longitudinally of opposing teeth toward the cone center of the gear and each provided with cutting teeth arranged in series one behind the other, means for alternately giving the cutters an inward cutting movement, so that during the inward cutting movement of one cutter, the other is moving out, means for rotating the arbor ahead one half of the circular pitch of the gear after one cutter has finished its cut and before the other cutter begins its cut, and means for oscillating the gear arbor about said cone center so that the cutter teeth of each cutter are, during their inward movement, fed over the faces of the gear teeth from their outer edges to their bases thus planing such faces at one stroke.

10. In combination in a bevel gear tooth planing machine, a rotary arbor or support for a gear to be cut, a pair of cutters on opposite sides of the gear mounted for reciprocation longitudinally of opposing teeth toward the cone center of the gear and each provided with cutting teeth arranged in series one behind the other, means for alternately giving the cutters an inward cutting movement, so that during the inward cutting movement of one cutter, the other is moving out, means for oscillating the gear arbor about said cone center so that the cutter teeth of each cutter are, during their inward movement, fed over the faces of the gear teeth from their outer edges to their bases, thus planing such faces at one stroke, means for also giving the cutters a lateral movement to produce the desired tooth curvature, and means for feeding the gear about its axis step by step between the cutting operations.

ROBERT L. HIBBARD.
FRED W. WAPPAT.